United States Patent
Huber

(10) Patent No.: US 11,448,627 B2
(45) Date of Patent: Sep. 20, 2022

(54) DEVICE AND METHOD FOR CHARACTERIZING CATALYTIC PROCESSES

(71) Applicant: hte GmbH the high throughput experimentation company, Heidelberg (DE)

(72) Inventor: Florian Huber, Heidelberg (DE)

(73) Assignee: HTE GMBH THE HIGH THROUGHPUT EXPERIMENTATION, Heidelberg (DE)

( * ) Notice: Subject to any disclaimer, the term of this patent is extended or adjusted under 35 U.S.C. 154(b) by 100 days.

(21) Appl. No.: 16/761,019

(22) PCT Filed: Oct. 25, 2018

(86) PCT No.: PCT/EP2018/079301
§ 371 (c)(1),
(2) Date: May 1, 2020

(87) PCT Pub. No.: WO2019/086325
PCT Pub. Date: May 9, 2019

(65) Prior Publication Data
US 2020/0355657 A1 Nov. 12, 2020

(30) Foreign Application Priority Data
Nov. 3, 2017 (EP) .................................. 17199924

(51) Int. Cl.
*G01N 31/10* (2006.01)
*B01J 19/00* (2006.01)
*B01J 19/24* (2006.01)

(52) U.S. Cl.
CPC ............ *G01N 31/10* (2013.01); *B01J 19/004* (2013.01); *B01J 19/245* (2013.01);
(Continued)

(58) Field of Classification Search
CPC ...... B01J 19/00; B01J 19/0006; B01J 19/004; B01J 19/0046; B01J 19/24; B01J 19/2445;
(Continued)

(56) References Cited

U.S. PATENT DOCUMENTS 6,224,832 B1 * 5/2001 Moore ................. B01J 19/0046
422/116
2007/0148062 A1 6/2007 Haas et al.
(Continued)

FOREIGN PATENT DOCUMENTS

CN        1512911 A     7/2004
CN    101274260 A    10/2008
(Continued)

OTHER PUBLICATIONS

International Search Report dated Dec. 17, 2018 in PCT/EP2018/079301, 4 pages.
(Continued)

*Primary Examiner* — Natasha E Young
(74) *Attorney, Agent, or Firm* — Lowenstein Sandler LLP

(57) ABSTRACT

Methods of catalytic process characterization using a reaction system having two or more reaction strands in a parallel arrangement, wherein each reaction strand has multiple series-connected reaction chambers or a single reaction chamber. Each reaction strand is supplied with a reactant stream subjected to process stages. Product streams discharged from the reaction strands are subjected to an analytical characterization, wherein the data achieved in the characterization are expressed in relative terms including the forming of a difference.

17 Claims, 6 Drawing Sheets

(52) U.S. Cl.
CPC .. *B01J 19/2445* (2013.01); *B01J 2219/00038* (2013.01); *B01J 2219/00243* (2013.01)

(58) Field of Classification Search
CPC .................. B01J 19/245; B01J 2219/00; B01J 2219/00002; B01J 2219/00027; B01J 2219/00038; B01J 2219/00049; B01J 2219/00243; B01J 2219/00274; B01J 2219/00277; B01J 2219/00279; B01J 2219/00281; B01J 2219/00286; B01J 2219/00351; B01J 2219/00389; B01J 2219/00418; B01J 2219/00495; B01J 2219/00583; B01J 2219/00585; B01J 2219/0059; B01J 2219/0068; B01J 2219/00702; B01J 2219/00707; B01J 2219/00718; B01J 2219/00745; B01J 2219/00747; G01N 31/00; G01N 31/10
See application file for complete search history.

(56) References Cited

U.S. PATENT DOCUMENTS

| | | |
|---|---|---|
| 2009/0258431 A1 | 10/2009 | Haas et al. |
| 2010/0320121 A1 | 12/2010 | Bauman et al. |
| 2011/0014718 A1 | 1/2011 | Haas et al. |
| 2011/0281763 A1 | 11/2011 | Zhou et al. |
| 2015/0353840 A1* | 12/2015 | Hensley .............. C07C 29/1518 502/61 |
| 2016/0252485 A1 | 1/2016 | Lange De Oliveira et al. |

FOREIGN PATENT DOCUMENTS

| | | |
|---|---|---|
| CN | 101275288 A | 10/2008 |
| CN | 107167333 A | 9/2017 |
| EP | 2263790 A2 | 12/2010 |
| GB | 8318196 A | 8/1983 |
| WO | WO 2005/063372 A2 | 7/2005 |
| WO | WO 2008/080365 A1 | 7/2008 |

OTHER PUBLICATIONS

Extended European Search Report dated Mar. 23, 2018 in European Patent Application No. 17199924.6, 3 pages.
Godini, H.R., et al., "Methane Oxidative Coupling: Synthesis of Membrane Reactor Networks", ACS, I&EC Research, May 2012. vol. 51, XP055469089, pp. 7747-7761.
Berg, J., et al., "Catalyst testing for hydrocracking and hydrotreating", PTQ Magazine Q1, 2015, pp. 121-127.
"Basis and application of automatic control engineering", Ed. Qi Liu, Mar. 2013, pp. 6-7.
Dik, et al., "Composition of stacked bed for VGO hydrocracking with maximum diesel yield", Catalysis Today 220-222, 2014, pp. 124-132.
Haas, et al., "High throughput testing of hydroprocessing catalysts for VGO/Resid", Jun. 2017, 1 page.
Third Party Observation for application No. EP20180792941, observation taking place Sep. 15, 2021, filed by Avantium Support BV, 3 pages.

* cited by examiner

Figure 2.a
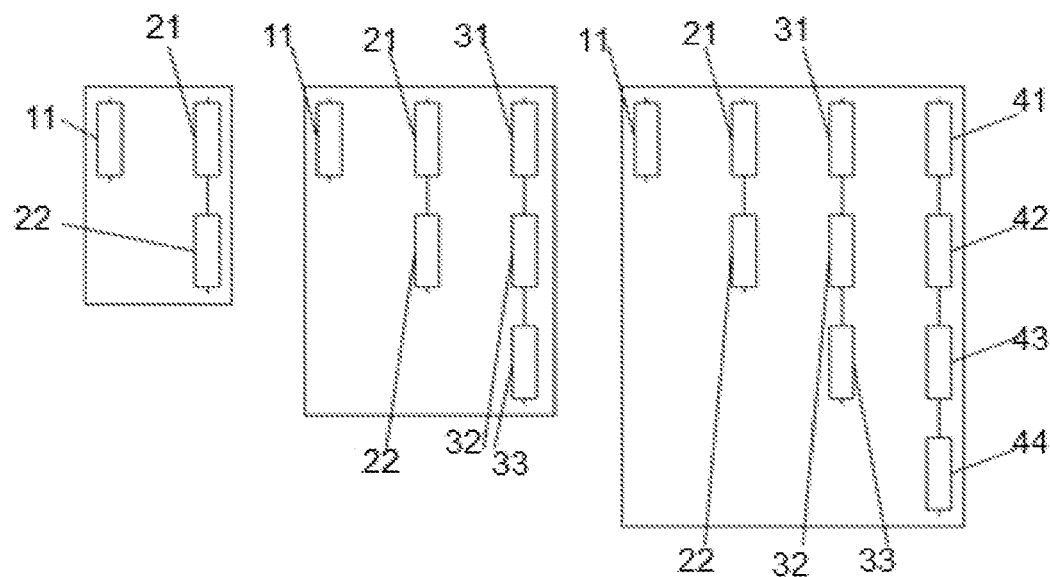
Figure 2.b
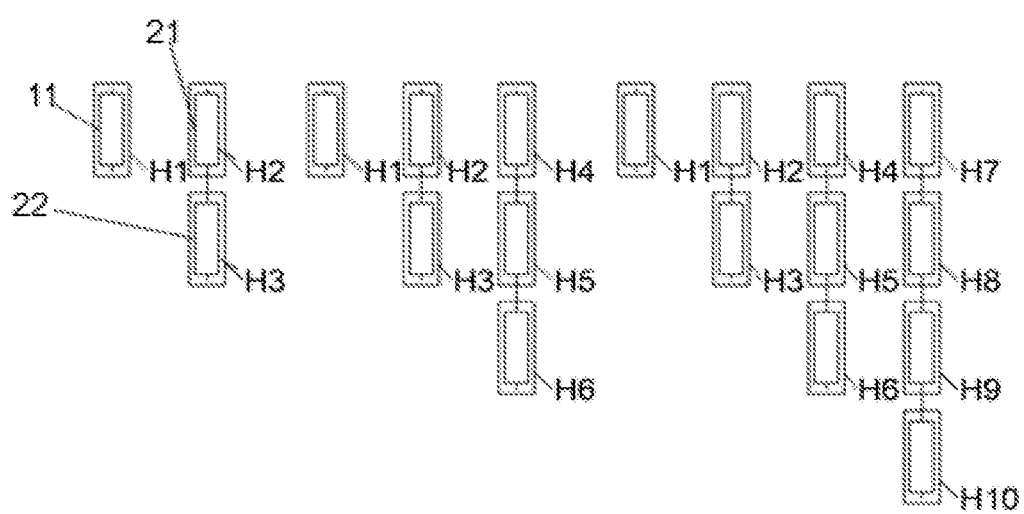

Figure 3.a
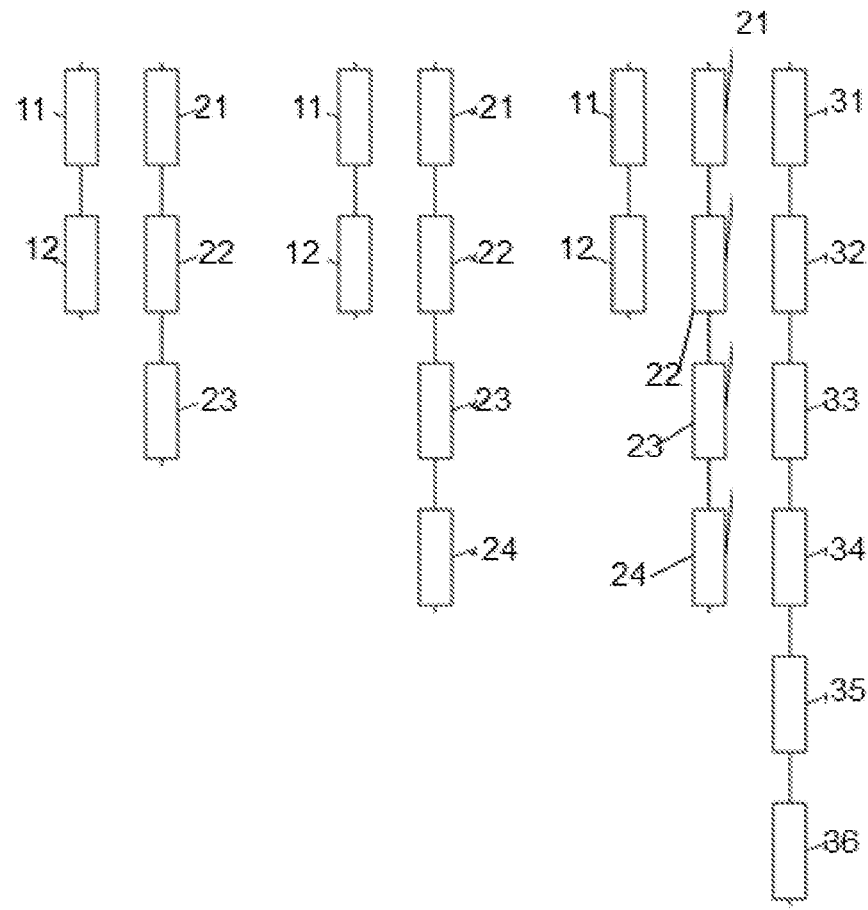
Figure 3.b
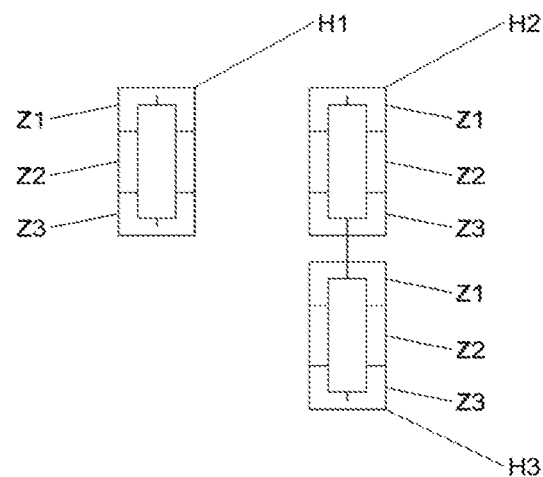

Figure 4.a
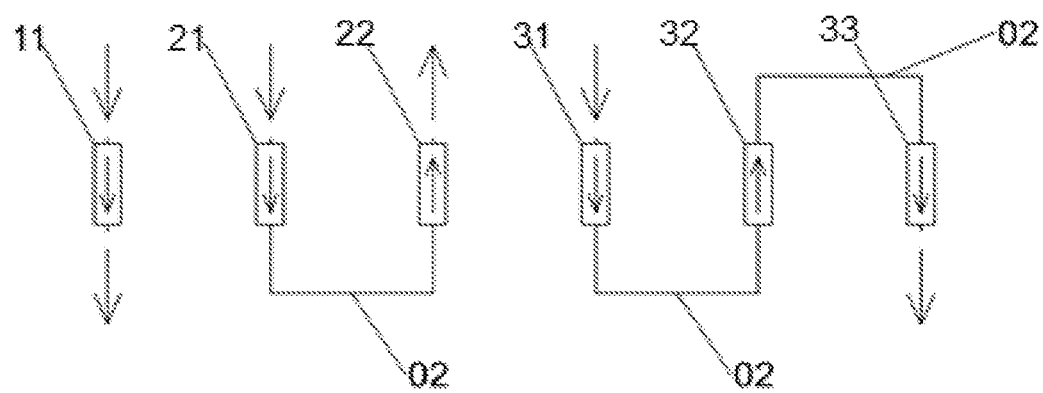
Figure 4.b
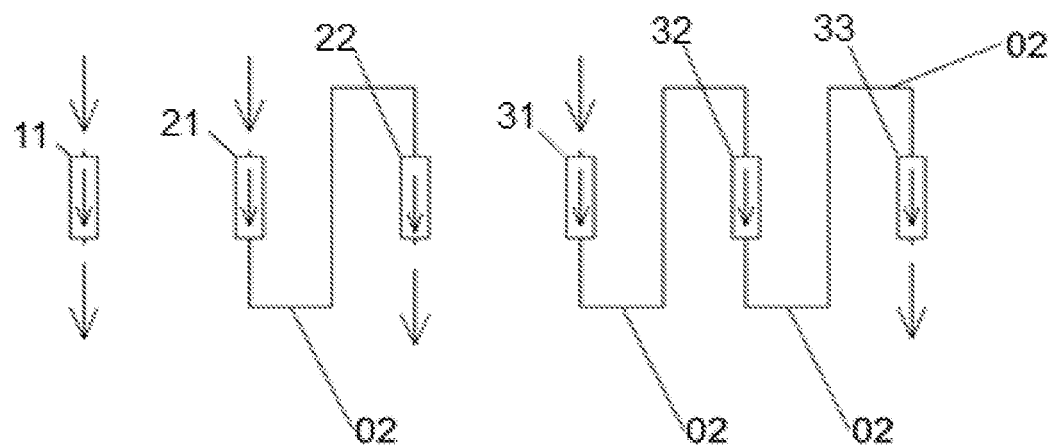

Figure 4.c
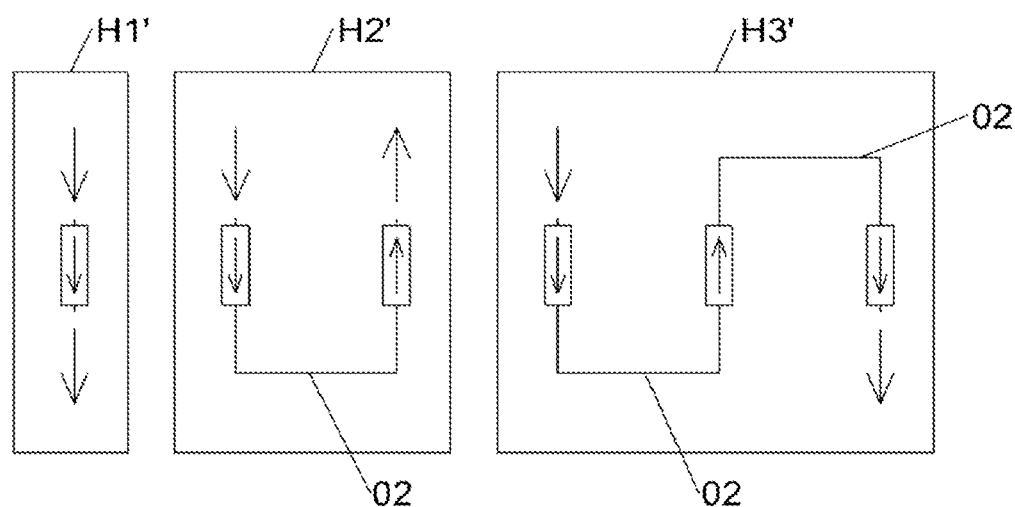
Figure 4.d
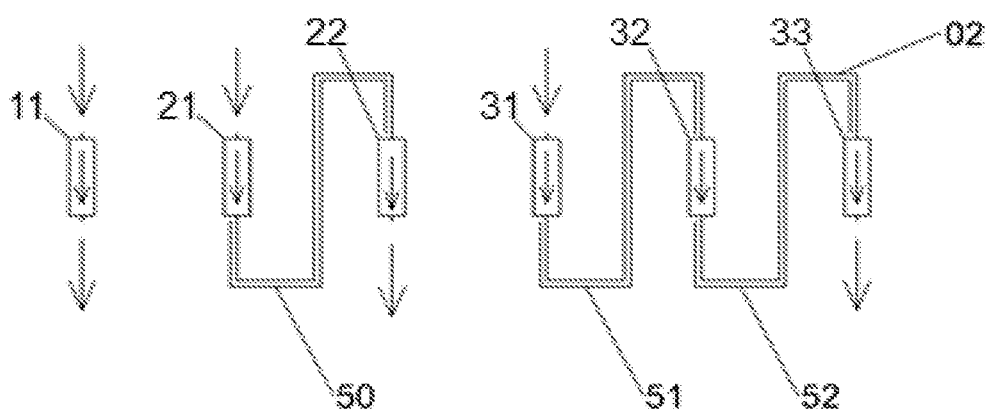

DEVICE AND METHOD FOR CHARACTERIZING CATALYTIC PROCESSES

CROSS-REFERENCE TO RELATED APPLICATION(S)

This application is a national stage entry of International Application No. PCT/EP2018/079301, published as WO 2019/086325, filed Oct. 25, 2018, which claims priority to European Application No. 17199924.6 filed Nov. 3, 2017.

The present invention relates to a multistage method, preferably a laboratory method, of catalytic process characterization, which is referred to below as CPC method. The CPC method is directed to the development of catalysts and to the identification of those catalysts of particular suitability for the processes in question. By means of the use of the CPC method, it is possible on the basis of laboratory tests to optimize industrial integrated processes and hence to improve yields, productivity and catalyst service life. In addition, it should also be noted that the CPC method can be coupled to computer-assisted methods or can make a contribution to improving computer-assisted simulations since the CPC method provides experimental data with high accuracy. The method of the invention comprises at least one reaction system having at least two reaction strands in a parallel arrangement. At least one of the reaction strands, the first reaction strand, comprises a series arrangement of two or more reaction chambers. At least one further reaction strand comprises a series arrangement of reaction chambers, wherein the number of reaction chambers is at least one reaction chamber fewer than in the first reaction strand. The reaction chambers in a parallel arrangement in the reaction system that are preferably filled with catalyst are contacted with reactant stream(s). The reactant streams may be monophasic gaseous or liquid streams of matter or polyphasic combinations of gases and/or liquids. The product streams generated within the reaction system that are derived from different process stages of the multistage method are subjected to analytical characterization. The apparatus with which the method of the invention is conducted is preferably equipped with a group of reaction systems. In such an embodiment, the method can be conducted with a multitude of reaction systems in a parallel manner. Thus, one aspect of the present invention, in a preferred embodiment and in conjunction with the parallelization of the reactor systems, also relates to the field of high-throughput research. Since it is possible by means of the apparatus of the invention and the method of the invention to study complex catalytic processes under process conditions of industrial relevance, the apparatus and the method are of great industrial interest.

The prior art discloses multistage apparatuses and methods for studies on catalysts or chemical processes. An example of these is PCT application WO 2008/080365 A1 by Richard F. Bauman et al., which describes multistage reactor tube arrangements for catalytic hydrogenation and processing of feedstocks that have a high proportion of impurities. In conjunction with the processing of comparatively nonvolatile feedstocks, the use of multistage processes and different catalysts is important in order to conduct the upgrading of the feedstocks stepwise.

In an article in PTQ Magazine Q1 2015 (pages 121-127) entitled "Catalyst testing for hydrocracking and hydrotreating", Jochen Berg et al. describe the performance of studies on hydroprocessing under conditions of industrial relevance by means of a high-throughput apparatus. The article also presents a case study relating to the testing of catalysts that have been introduced in a stacked arrangement within individual tubular reactors and which have then been tested under identical feed conditions. The high-throughput apparatus consists of multiple tubular reactors in a parallel arrangement, wherein the different process stages are performed within the stacked arrangement of the individual tubular reactors. The overall process comprises the following three process stages: 1. demetallization (HDM) of atmospheric oil distillation residues, 2. desulfurization (HDS) at moderate activity for HDS and 3. desulfurization (HDS) at high HDS activity.

Godini et al. describe, in the journal Industrial & Engineering Chemistry Research (2012), vol. 51, no. 22 (pages 7747-7761), a method of optimizing a chemical process for oxidative methane coupling. The process consists in the optimized embodiment of two reaction strands with one or two reaction chambers connected in series. The number and operative relationship of the reaction strands and reaction chambers serves to maximize the overall process output. The reaction chambers, especially the first reaction chamber disposed in the two reaction strands, a fixed bed reactor (FBR) and a conventionally packed membrane reactor (CPBMR), fulfill different functions here and constitute different process stages. The process optimization is based on the theoretical assessment of the operative relationships between the three reaction chambers. The information relating to the individual performance of the three reaction chambers comes from separate studies of the three reaction chambers without the operative relationships in the process described.

The problems underlying the present invention are that of providing a method by which catalytic tests can be performed with high accuracy and high precision. A further problem addressed is that of configuring the method in such a way that the method can also be used to examine multistage reaction sequences of such a character that the individual process stages require different catalyst systems and/or individually adjustable reaction conditions.

The problems stated here are solved by providing a method of catalytic process characterization, called CPC method hereinafter, comprising a reaction system having, in a parallel arrangement, two or more reaction strands having a different number of reaction chambers and wherein a single reaction strand comprises multiple series-connected reaction chamber or a single reaction chambers and the method is characterized by the following steps:

i) the individual reaction chambers of the reaction strands are filled with catalyst material, ii) each reaction strand is supplied with a reactant stream, iii) the reactant streams supplied to the reaction strands are subjected to different numbers of process stages in the different reaction strands, where an individual process stage comprises either one type of reaction or one degree of conversion in a given reaction, iv) the product streams discharged from the reaction strands in a parallel arrangement are subjected to an analytical characterization, v) the data achieved from the different reaction strands in the analytical characterization of the product streams are expressed in relative terms.

In a further-preferred embodiment, it is a characteristic feature of the CPC method that each reaction system comprises, in a parallel arrangement, two or more reaction strands having a different number of reaction chambers, a single reaction strand comprising multiple series-connected reaction chambers or a single reaction chamber, and the method being characterized by the following steps:

i) the individual reaction chambers of the reaction strands are filled with catalyst material, ii) each reaction strand is supplied with a reactant stream, iii) the reactant streams supplied to the reaction strands are subjected to a different number of process stages in the different reaction strands, where an individual process stage comprises either one type of reaction and/or one degree of conversion in a given reaction, iv) the product streams discharged from the reaction strands in a parallel arrangement are subjected to an analytical characterization, v) the data achieved from the different reaction strands in the analytical characterization of the product streams are expressed in relative terms; steps i)-v) or steps ii)-v) are performed simultaneously in the two or more reaction systems.

What is meant by the fact that the reactant streams supplied are subjected to different numbers of process stages in the different reaction strands is that the full number of process stages is performed in one reaction strand and a reduced number of process stages having at least one process stage fewer than the multistage process which is performed with the full number of process stages is performed in at least one reaction strand.

In a preferred embodiment, it is a characteristic feature of the method of the invention that each process stage is performed in a separate reaction chamber, wherein each reaction strand has that number of reaction chambers corresponding to the number of process stages performed in that reaction strand. If just one process stage is performed in one reaction strand, it is preferable that the corresponding reaction strand comprises just a single reaction chamber.

In a preferred embodiment, the CPC method has a number of process stages in the range of 2-40. The number of process stages is referred to as $A_{PS}$ in the context of the present document. The term "process stage" relates to one reaction type or one degree of conversion of a given reaction. A process stage based on the degree of conversion relates to a degree of conversion that differs from another degree of conversion in a characteristic manner as set out hereinafter. The reaction type describes the manner of a chemical conversion, and the degree of conversion the amount of reactants converted or the amount of product formed. Examples of reaction types that each constitute a process stage are hydrogenation, cracking processes, isomerization, alkylation, desulfurization, denitrification. The reaction type and/or degree of conversion are characteristic of the description of a process stage. The product stream obtaining in the process stage can be characterized qualitatively and quantitatively, and is thus characteristic of a process stage. The process stage depends on a multitude of parameters including temperature and catalyst. What is important is that, after the performance of a process stage, an analytically measurable change in the product stream can be obtained. The method of the invention offers the advantage of simultaneous performance of comparative tests under virtually identical conditions. In order for the process stage to be a process stage, the product stream is to have a chemical change from the reactant stream. In relation to the degree of conversion of a reaction type, the degrees of conversion desired in each case may depend on the chemical method being examined, which is the subject of the study. For example, the CPC method may be used to examine a two-stage process that comprises denitrification and cracking. In the example, a nitrogen-containing reactant stream is used. The catalyst used for the cracking has only minor resistance with respect to the nitrogen. Therefore, denitrification of the nitrogen-containing reactant stream should be undertaken first, which is done in a first process stage. The desired degree of conversion has been attained when the nitrogen content in the product stream after the denitrification is below a threshold value in order that the product stream can be used in the downstream process stage without poisoning the cracking catalyst.

Further preferably, the number of process stages is in the range of 2-20; most preferably, the number of process stages is in the range of 3-10. The number of process stages has an influence on the complexity of the method of the invention. Or in other words, a characteristic feature of the complexity of the method is what total number of reaction systems and what number of process stages within the individual reaction systems are being studied. Another reason for this is that the manageability of the method is limited by the manageability of the number of reactors. For reasons of practicability, it is advantageous that the total number of reactors which is used for the method of the invention is in the region of up to 100 reactors, preferably in the range of 6-80 reactors, further preferably in the range of 8-60 reactors. In the context of the present description, the terms "reaction stage", "method stage" and "process stage" are used as synonymous terms. However, a preferred aspect of the invention also relates to the method conditions and the heating of the reactors, particular preference being given to the method when the reactors of the first process stage are stored at the same temperature, it being further preferable when the reactors of the first process stage are heated by the same heating elements since this can ensure more exact thermal control and regulation of the reactor temperature. This can further increase the comparability of the data.

In the performance of the CPC method, it is preferable that the reactant streams that are supplied to the reaction strands in step ii) each have the same chemical composition. In step ii), each reaction strand is supplied with a reactant stream, or the reactant stream is supplied to the first reaction chamber of the respective reaction strand.

It is preferably a characteristic feature of the CPC method that the reactant streams that are supplied to the reaction strands correspond in terms of at least one flow rate parameter from the group of molar flow rate, volume flow rate, mass flow rate. Further preferably, the reactant streams that are supplied to the reaction strands correspond in two flow rate parameters; even further preferably, the reactant streams that are supplied to the reaction strands correspond in three flow rate parameters.

In a further-preferred embodiment, it is a characteristic feature of the CPC method that, in the performance of step iii), the downstream reaction chambers of the individual reaction strands within a reaction system are additionally supplied with reactant stream, and specifically each downstream reaction chamber is supplied with the same composition and the same amount.

In a preferred embodiment of the CPC method, the reaction chambers of the reaction system are each individually stored at a controlled temperature in the range from −25 to 900° C. Such a mode of temperature control prevents disruption between adjacent reaction chambers. Disruption can arise from the process stages that proceed in the adjacent reaction chambers being associated with very different exothermicity that leads to uncontrolled temperature effects in the environment. This can be the case, for example, in highly exothermic processes.

Preferably, the CPC method is performed in such a way that the reaction chambers of different process stages of a reaction system are stored at different temperatures, and identical process stages of a reaction system at the same temperature, where the temperature is in the range from −25 to 900° C., the temperature preferably being in the range from 0 to 800° C. It may also be a particular advantage here that the reaction chambers of the same process stages are stored in the same heating block with heating elements, which enables very high accuracy in the establishment of the temperature. As a result, the comparability of the individual process stages is particularly exact, which is associated with one aspect of the invention. The selection of the preferred heating system depends both on the nature of the chemical method that is the subject of the respective study and on the dimensions of the tubular reactors. If the chemical method is associated with high exothermicity, individual heating devices for each tubular reactor are advantageous. More particularly, however, it is also advantageous that the temperatures of the tubular reactors of a reaction system that have the same process stage are controlled by means of a common heating device since this can assure virtually identical conditions in relation to the temperature control, provided that no high exothermicity occurs, as a result of which the tubular reactors would disrupt one another.

In one embodiment of the CPC method which is also preferred, the reaction chambers are configured as stirred tank reactors. In this embodiment, it is also preferred that the reaction chambers are configured as stirred tank reactors and step i) is replaced in that the catalyst is present in the reactant stream supplied in the form of a homogeneous catalyst or a slurry catalyst in the reactant stream and the individual reaction strands in step ii) are supplied collectively with the reactant stream, the reactant stream being in liquid form. In further embodiments, the reactant stream is in polyphasic form, for example gaseous/liquid, liquid/liquid or gaseous/liquid/solid. Preferably, the stirred tank reactors are utilized in continuous operation.

The CPC method offers numerous embodiments and possible applications. In one embodiment, the CPC method is used to study homogeneously catalyzed reactions, using tubular reactors as reaction chambers. The tubular reactors are used in place of stirred tank reactors. In a further embodiment, the CPC method is used to study processes comprising homogeneously and heterogeneously catalyzed process stages. In conjunction with the study of processes comprising homogeneously and heterogeneously catalyzed process stages, in a preferred embodiment, the different types of reaction chambers within a process strand are combined in such a way that tubular reactors are connected to stirred tank reactors. According to the process, the first process stage can be performed in a tubular reactor or in a stirred tank reactor, in which case a differently configured reaction chamber is connected downstream of the process stage.

The supply of a homogeneous catalyst means that the CPC method can be utilized for study of acid-catalyzed or enzyme-catalyzed processes. The supply of a slurry catalyst means that the CPC method can be utilized to study catalytic slurry processes, for example resid upgrading, Fischer-Tropsch synthesis or hydrogenation of fatty acids (fat hydrogenation). It is thus apparent that the CPC method can be used in a very versatile manner.

In a further embodiment of the invention, the reaction chambers are configured in the form of continuous fluidized bed reactors. In step i), the individual reaction chambers of the reaction strands are filled with catalyst material and, in step ii), each reaction strand is supplied with a reactant stream.

In a preferred embodiment, the CPC method is used to study solid-state catalysts that are introduced into tubular reactors, and hence it is preferable that the reaction chambers are configured as tubular reactors. The term "tubular reactors" relates to all bodies having a linear axis at least twice as long as the diameter of the linear axis, and having a cavity along the linear axis. One end of the body forms the access to the cavity, and one end of the body forms the exit to the cavity. The body that forms the tubular reactor is preferably in cylindrical form. The tubular reactors preferably comprise a metallic material; the tubular reactors further preferably comprise stainless steel as metallic material. As additionally the tubular reactors may also comprise ceramic inlays, preferably ceramic inlay tubes.

In the present description of the invention, the term "tubular reactor" is used since it is that embodiment which is the most preferred. However, it should also be noted that the tubular reactor may be replaced by a stirred tank reactor, in which case the features that are mentioned in relation to the tubular reactor can also be implemented in conjunction with a stirred tank reactor. One example is the apparatus for controlling the temperature of the tubular reactors, which can also be used in the same way to control the temperature of stirred tank reactors. Thus, that disclosure of technical features that is mentioned in association with tubular reactors is also applicable in relation to other reactors, provided this is possible on implementation from the technical point of view of the person skilled in the art.

Furthermore, it is preferable that the reaction chambers are configured as tubular reactors having an internal diameter in the range of 2-50 mm and a length in the range of 5-150 cm. Further preferably, the internal diameter of the tubular reactors is in the range of 3-25 mm and the length of the tubular reactors in the range of 5-150 cm. Preferably, the length of the tubular reactors is in the range of 15 cm-80 cm. It is further preferable that the individual tubular reactors have the same internal diameter and the same length. Preferably, the internal diameter is in the range of 3-25 mm and the length is preferably in the range of 15 cm-80 cm. Tubular reactors are reaction tubes, or the tubular reactors at least also have one reaction tube in which elements for fixing of the catalyst material may be present. Construction of reactors and fixing of catalyst beds are known to the person skilled in the art.

In a still further-preferred embodiment, it is a characteristic feature of the CPC method that the tubular reactors of the same process stage of a reaction system each comprise the same catalysts. Preferably, the catalysts are in particulate form and the particle diameter is in the range of 1-10 000 µm, preferably of 50-5000 µm, further preferably 100-4000 µm. If the particles are nonspherical particles, the term "particle diameter" relates to the equivalent diameter of a sphere having the same specific surface area, calculated as 6*particle volume/particle surface area. The catalyst particles used may be produced by all methods known to the person skilled in the art. For example, the methods used for production of the catalysts may include those methods that comprise steps such as precipitation, drying, impregnation, sieving, pelletization, extruding, spray drying, calcining.

It is in no way ruled out here that the catalyst particles have an order of size greater than 10 000 µm and are in the form of extrudates. However, it is of course necessary to choose the size of the reaction tube used in such a way that it fits the dimensions of the catalyst material. One of the advantages of the CPC method is that small amounts are tested. It is thus also preferable to use small particles that are studied in small reaction chambers.

In a preferred embodiment of the CPC method, that within the reaction system, the tubular reactors of the same process stage each comprise the same catalyst(s), where the catalysts are diluted with inert material and where the catalysts of a process stage comprise the same degree of dilution with inert material which is characterized by a mass ratio of catalyst to inert material in the range from 0.01:100 to 100:1, preferably in the range from 1:10 to 10:1. In this case, the inert material has a particle diameter in the range of 1-10 000 μm, preferably a particle diameter in the range of 50-4000 μm, it being preferable that the ratio of internal reactor diameter to particle diameter of the inert material is greater than 25:1. The dilution with inert material can further improve the accuracy of the analysis. This also means that the performance of the CPC method in the presence of inert material results in synergistic effects, relating to a rise in accuracy that has not been achieved to date in this way by means of the methods known in the prior art. The use of inert material is advantageous especially when the reactions performed by means of the catalysts have an exothermicity with a rise in the reactor temperature resulting from the reaction of greater than 1° C., or the ratio of internal reactor diameter to catalyst particle diameter is less than 25:1. In the case of nonspherical particles, the term "diameter" relates to the equivalent diameter possessed by a sphere having the same specific surface area as the particle in question, calculated as 6*particle volume/particle surface area. The ratio of internal reactor diameter to particle diameter of the inert material is preferably greater than 25:1. It is a characteristic feature of the inert material that it has zero or no noticeable catalytic activity. The inert material preferably comprises a material from the group of sand ($SiO_2$), quartz, corundum and SiC.

In step iv), the product streams discharged from the reaction strands arranged in parallel are subjected to an analytical characterization, the result of the analysis of the different product streams being expressed in relative terms. Preferably, the expression in relative terms comprises the forming of a difference, the mass balance being characterized by a standard deviation of +/−10% by weight, the mass balance preferably being characterized by a standard deviation of +/−5% by weight, further preferably by a standard deviation of +/−2% by weight, even further preferably by a standard deviation of +/−1% by weight. The mass balance is also partly determined by the respective process parameters. It is advantageous in conjunction with the method of the invention that it is possible to dispense partly, preferably entirely, with intermediate sampling. This rules out the disruption of the reaction system that otherwise occurs as a result of the intermediate sampling. The disruption includes, for example, pressure fluctuations on switching of the valves in order to take sample streams, disruption of the mass balance by errors associated with the discharge of streams, disruption to the catalytic conversion or irreversible damage to the catalyst activity in conjunction with the discharge of sample streams.

The illustrative embodiments are to illustrate the advantageous aspects of the method of the invention in detail. The details relate to a method of hydroprocessing hydrocarbonaceous fuels or oils (hydrocarbonaceous phase). The reaction system is supplied with a reactant stream comprising a hydrocarbonaceous phase which is in the form of a liquid phase or of a liquid phase in conjunction with gaseous phase in the reaction system. In addition, reactant stream the reactant stream comprises hydrogen as gaseous reactant. In the supply of the hydrocarbonaceous phase to the reaction system, the LHSV is 1 $h^{-1}$. Given a total catalyst volume of the reaction system of 5 mL, this corresponds to a liquid reactant flow rate of 5 mL/h. By comparison, given a total catalyst volume of 50 and 500 mL, the reactant flow rate is 50 and 500 mL/h respectively.

In order to obtain an amount of liquid sample sufficient to characterize the individual reaction stage, it is necessary to take a certain minimum amount of samples. In the performance of the method, the sampling volume should be, for example, in the range of 5-10 mL per sample. The taking of this amount of sample between the reaction chambers which is practiced according to the prior art leads to interventions into the method that are viewed as disruption to the system, it being possible to make a detailed determination of the extent of the disruption and the associated disruption periods.

The term "disruption period" in the context of the present description is understood to mean that period of time in which, owing to the sampling time, no liquid reactant stream is being fed into the downstream reaction chambers, as a result of which the reaction conditions of the downstream reaction are modified and the chemical equilibrium is disrupted. The existence of disruption and the duration of the disruption period leads to impairment of the accuracy and precision of the method.

The performance of the method for hydroprocessing hydrocarbonaceous fuels or oils by means of the method of the invention comprises a duration of several hours, several days or even several weeks. For example 24 h, 48 h, 100 h or 150 h, in individual cases even 100 days or more.

The estimate that follows is given for the duration of disruption periods, this being determined using the catalyst volume used which is used in a performance of the method. The estimate is based on the performance of the method using an LHSV of 1 $h^{-1}$ and a sampling volume of 5-10 mL per sample.

If the catalyst volume is 5 mL, the disruption period is in the region of 1-2 hours per sampling. If the catalyst volume is 50 mL, the disruption period is in the region of 6-12 minutes per sampling.

If the catalyst volume is 500 mL, the disruption period is in the region of 36 to 72 seconds per sampling.

In the case of pilot plants with a catalyst volume of more than 500 mL, the disruption periods that are caused by sampling between the reaction chambers are in the region of seconds. In the reaction chambers that are preferred in the present invention, the disruption period that impairs the reaction in the downstream reaction chambers is in the region of minutes to hours. It becomes clear from the example that a particular advantage of the method is apparent here. It becomes clear from the example that a particular advantage of the method is apparent here.

Preferably, the method of the invention relates to the characterization of processes in which liquid product streams are formed, or liquid product streams in the presence of gaseous product streams. It is further preferable that the CPC method is conducted in parallel; preferably, the performance of the CPC method comprises at least two reaction systems in a parallel arrangement, further preferably four reaction systems in a parallel arrangement, further preferably still eight reaction systems in a parallel arrangement. Further preferably, it is a characteristic feature of the method that, in each reaction system, at least one liquid sample is taken per reaction strand and per test day, with a volume of the individual liquid samples of preferably >1 mL, further preferably >2 mL, further preferably >4 mL.

It is preferably a characteristic feature of the CPC method that the reactant streams that are supplied to a reaction system are selected from the group of natural gas (C1-C4 hydrocarbons), crude oil, naphtha, gasoline, kerosene, diesel, middle distillates, vacuum gas oil, atmospheric or vacuum residue oil, mineral oils, biobased oils, hydrogen or synthesis gas. The reactions conducted by means of the CPC method are preferably reactions from the refinery sector, petrochemistry or synthesis gas chemistry. The reactions from the refinery sector may be selected from the group of hydrogenation, cracking processes, isomerization, desulfurization, denitrification, dearomatization, deoxygenation, demetallization, dechlorination. The reactions from petrochemistry may be selected from the group of reforming, alkylation, transalkylation, hydrogenation, dehydrogenation, isomerization, mild cracking processes, metathesis, oligomerization, natural gas (C1-C4) to aromatics. The reactions from syngas chemistry may be selected from the group of Fischer-Tropsch synthesis, methanol and dimethyl ether (DME) synthesis, methanation, synthesis of higher alcohols, methanol to olefins (MTO), methanol to gasoline (MTG), methanol to aromatics (MTA).A preferred embodiment comprises the combination of two or more of the abovementioned reaction types, for example the combination of demetallization, desulfurization and denitrification, cracking of vacuum gas oils for production of petrochemicals, mineral oils and fuels. A further example comprises the production of mineral oils from residue oils by means of demetallization, desulfurization and denitrification, cracking, isomerization and final hydrogenation. In this preferred embodiment of the CPC method, the processes adduced are conducted separately from one another in series-connected reactors at different reaction temperatures.

In a preferred embodiment, it is a characteristic feature of the CPC method that it conducted at a pressure in the range of 1-500 bara, where the liquid reactants are supplied with an LHSV in the range of 0.05-20 $h^{-1}$ and the gases with a GHSV in the range of 10-50 000 $h^{-1}$. Preferably, the CPC method is conducted at a pressure in the range of 1-250 bara. The unit bara relates to the absolute pressure. Preferably, in the performance of the CPC method, tubular reactors are used, and the tubular reactors used in the same process stage preferably each have the same volume and the same diameter.

The advantage of the CPC method is that the product streams of the individual reactor stages in the multistage processes can be generated, analyzed and compared via difference formation simultaneously and without disruption. It is preferably a characteristic feature of the method that the liquid reactants are supplied with an LHSV in the range of 0.05-25 $h^{-1}$, further preferably of 0.1-20 $h^{-1}$, and the gases with a GHSV in the range of 10-75 000 $h^{-1}$, further preferably of 100-50 000 $h^{-1}$. Preferably, the reactant streams are supplied to the tubular reactors of a reaction system via the same feed unit, preferably using high-pressure pumps for the metered addition of the liquids.

A further aspect of the invention is a method in which a group of CPC methods is conducted simultaneously, it being preferable that the number of CPC methods conducted simultaneously is in the range of 2-20. Further preferably, the number of CPC methods conducted simultaneously is in the range of 4-10. Preferably, each reaction system is supplied with at least two reactant streams of the same chemical composition. With regard to the degree of parallelization, it can be stated that the higher degree of parallelization brings an advantageous effect with regard to the acceleration of the study and testing. It should also be noted that the reaction studies are performed under conditions that are very demanding from a technical point of view. It is also conceivable that the method is operated in conjunction with higher degrees of parallelization, but the technical complexity and manageability of the method in that case is also higher.

The invention also relates to an apparatus for characterization of catalytic processes by means of the CPC method within the scope of the description given here or else an apparatus for simultaneous performance of multiple CPC methods, having the characteristic feature that the apparatus has one or more reaction systems, each reaction system has, in a parallel arrangement, at least two reaction strands having reaction chambers that are equipped with a different number of reaction chambers in the reaction strands.

If the apparatus for performance of the CPC method comprises two process stages (i.e. $A_{PS}=2$), the apparatus is a reaction system having two reaction strands, where one reaction strand has two series-connected reaction chambers and one reaction strand a single reaction chamber. In the case of an apparatus for performance of the CPC method having three process stages ($A_{PS}=3$), the apparatus comprises a reaction system having at least two reaction strands, where one reaction strand has three series-connected reaction chambers and at least one reaction strand that has a number of reaction chambers of less than three.

In a preferred embodiment, it is a characteristic feature of the apparatus that the individual connecting conduits by which the reaction chambers within a reaction strand are connected are provided with one or more temperature control units and the individual connecting conduits are heated in each case at the temperature corresponding to the temperature of the reaction chamber positioned upstream of the connecting conduit.

Preference is given to an apparatus for performance of the CPC method which has the characteristic feature that the connections between the reaction chambers arranged in series in the reaction strands either have no operative connection to switching valves or that the operative connections are equipped with switching valves, where the components connected to the connecting conduits are feed elements by means of which fluid streams are supplied.

Preferably, the reaction chambers are in the form of tubular reactors and the tubular reactors are aligned vertically, the apparatus having the characteristic feature that the longitudinal axes of the series-connected tubular reactors of a reaction strand lie along a common axis line or that the longitudinal axes of the tubular reactors of a reaction strand are in a parallel arrangement; the parallel arrangement of the tubular reactors has been provided either with U- or S-shaped connecting elements, it being possible by means of the U-shaped connecting elements to achieve alternating flow through the connected tubular reactors, and by means of the S-shaped connecting elements to achieve aligned flow through the tubular reactors.

The flow direction of the reactant stream through the individual process stages can be chosen, such that the flow through the individual tubular reactors is upstream, downstream or alternating. In the case of parallel arrangement of tubular reactors, the guiding of the reactant stream is defined by the configuration of the connecting elements or connecting conduits (02). It is preferable here that the flow through the tubular reactors is downstream. In the specification of the mass flow direction in conjunction with the flow direction, it should be noted that this also includes a vertical arrangement of the tubular reactors within the apparatus. It is not ruled out that the tubular reactors also have a small variance from a vertical arrangement, but the variance is preferably 45° or less. The parallel arrangement of the tubular reactors or the arrangement of the tubular reactors in a lateral plane offers the advantage that an existing high-throughput apparatus can be converted to the apparatus of the invention. It is thus also possible to conduct the method of the invention with existing apparatuses if they are retrofitted in an appropriate manner and adapted for the CPC method.

In a preferred embodiment, it is a characteristic feature of the apparatus that the terminal tubular reactors of each reaction strand of the reaction systems or of the reaction system are equipped with a pressure-retaining device, the terminal tubular reactors of each reaction strand of the reaction systems preferably being equipped with a common pressure-retaining device.

Beyond, the invention also comprises a software controller present in the program controller of the apparatus. The software controller enables the performance of the CPC method in a single apparatus in which one CPC method only is conducted or in a parallel apparatus in which a number of multiple CPC methods are conducted simultaneously. The software controller enables control and/or regulation of the apparatus, the control and/or regulation being performable either semiautomatically or fully automatically.

The advantage of the CPC method is that the multistage parallel performance with an appropriate number of tubular reactors and the associated process stages has a low propensity to disruption. Methods known in the art with multistage reactor tube arrangements, as described, for example, in PCT application WO 2008/080365 A1, proceed from a serial arrangement of tubular reactors, and the product streams are derived by means of intermediate sampling. The method of the invention rules out those disruptive influences that occur on sampling of product fluid from the connecting conduits between reactors. Preferably, the method is of significance for tubular reactors in which the individual tubular reactor has been filled in each case with an amount of catalyst of 0.1-100 g, the amount of catalyst preferably being in the range of 0.5-80 g per tubular reactor.

It should be noted that the method of the invention does not relate to those processes that are performed in pilot plant operation and/or in production operation, where the amount of catalyst per tubular reactor is, for example, >1000 g. The method of the invention dispenses with intermediate sampling. By means of the method of the invention, it is possible to simulate the information from product stream characterization by means of tubular reactors or tubular reactor groups in a parallel arrangement which have a smaller number of process stages than that tubular reactor group which forms the main tubular reactor group (called the main strand) of the reaction system. The higher process stages are not deprived of any fluid load, as would be the case on taking samples from the connecting conduit. In the case of small amounts of catalyst that are used in conjunction with the method of the invention in an advantageous execution, it is possible when dispensing with the taking of sample fluid to achieve significantly better reaction conditions in relation to compliance with reaction equilibria. The disruption that can result from the taking of sample fluid from the connecting conduits of reactors arranged in series can cause the times for equilibration or re-equilibration in the range of 0.25-480 minutes. Independently thereof, it is also possible for disruption to the reaction characteristics to be caused, extending as far as reversible or irreversible damage to the downstream catalyst, which remains unnoticed by the operator of the apparatus. The disruption is associated with a shift in the equilibrium position, which no longer returns to the former equilibrium state. These are systematic disruptions that remain unnoticed in practice by the operator and/or are attributed to the catalyst or the chosen process conditions. It was entirely unexpected that the CPC method could achieve an improvement in accuracy and precision compared to the method known in the art. The improvements enable better examination of real reaction systems under real test conditions than is possible by the methods known in the art. It is thus also possible to minimize the scale of the amounts of catalyst used by means of the method of the invention compared to amounts of catalyst that are used in a pilot plant. The method of the invention relates to the use of amounts of catalyst smaller than 100 g per reaction chamber. In pilot plants, the amount of catalyst used is in the region above 100 g. Owing to the improved data quality provided by the method of the invention using small amounts of catalyst, it is possible to reduce the number of pilot plant tests with large amounts of catalyst. The method of the invention enables saving of energy and resources since the improved quality of test data necessitates fewer pilot plant tests.

In a preferred embodiment, it is a characteristic feature of the CPC method that the at least two reactant streams that are supplied to the respective reaction system are chosen such that these at least two reactant streams correspond in terms of at least one flow rate parameter from the group of molar flow rate, volume flow rate and mass flow rate, preferably correspond in two flow rate parameters and further preferably correspond in three flow rate parameters. It is significant and advantageous that the tubular reactors of the reaction system that are arranged in parallel can be supplied with exactly the same amounts of reactants, and therefore the catalysts present in the reactor tubes are subjected to highly accurately comparable conditions. This means that each reaction strand of a reaction system is supplied with a reactant stream, and it is preferable here that these reactant streams correspond in one aspect.

Further preferably, it is a characteristic feature of the CPC method that the tubular reactors of the first reaction stage of a reaction system are each filled with a pretreatment catalyst, preferably an identical pretreatment catalyst. It should be noted that the method is especially also suitable for studying complex and multistage processes involving multiple process stages.

In a preferred embodiment, it is a characteristic feature of the method of the invention that the reactant streams supplied to the at least one reaction system are selected from the group of natural gas—light, moderate and/or heavy in terms of its characteristics—crude oil, naphtha, gasoline, kerosene, diesel, middle distillates, vacuum gas oil, atmospheric or vacuum residue oil, mineral oils, biobased oils, hydrogen or synthesis gas, and the reactions conducted by means of the method are reactions from the refinery sector, petrochemistry or synthesis gas chemistry. The reactions from the refinery sector may be selected from the group of hydrogenation, cracking processes, isomerization, desulfurization, denitrification, dearomatization, deoxygenation, demetallization, dechlorination. The reactions from petrochemistry may be selected from the group of reforming, alkylation, transalkylation, hydrogenation, dehydrogenation, isomerization, mild cracking processes, metathesis, oligomerization, natural gas (C1-C4) to aromatics. The reactions from syngas chemistry may be selected from the group of Fischer-Tropsch synthesis, methanol and dimethyl ether (DME) synthesis, methanation, synthesis of higher alcohols, methanol to olefins (MTO), methanol to gasoline (MTG), methanol to aromatics (MTA). A preferred embodiment comprises the combination of two or more of the abovementioned reaction types, for example the combination of demetallization, desulfurization and denitrification, cracking of vacuum gas oils for production of petrochemicals, mineral oils and fuels. A further example comprises the production of mineral oils from residue oils by means of demetallization, desulfurization and denitrification, cracking, isomerization and final hydrogenation. In this preferred embodiment of the CPC method, the processes adduced are conducted separately from one another in series-connected reactors at different reaction temperatures. This enables individual temperature control for each individual process stage. At the same time, a realistic reactant stream from the upstream process stage is metered into the downstream process stages, meaning that there is no need for the provision or simulation of intermediate streams from one process stage into the next. The possibility of metered addition of an additional reactant stream upstream of each process stage improves the simulation of the industrial process stages with maximum trueness to reality. Another advantage of the method of the invention is that the product streams of the individual reactor stages in the multistage processes can be generated, analyzed and compared via difference formation simultaneously and without disruption. It is preferably a characteristic feature of the method that the liquid reactants are supplied with an LHSV in the range of 0.05-25 $h^{-1}$, further preferably of 0.1-20 $h^{-1}$, and the gases with a GHSV in the range of 10-75 000 $h^{-1}$, further preferably of 100-50 000 $h^{-1}$. Preferably, the reactant streams are supplied to the tubular reactors of a reaction system via the same feed unit, preferably using high-pressure pumps for the metered addition of the liquids. Natural gas may be in the form of light, moderate or heavy natural gas. Light natural gas includes 5% by volume of higher hydrocarbons (C2-C4). Moderately heavy natural gas includes 10-12% by volume of higher hydrocarbons, and heavy natural gas about 20-25% by volume of higher hydrocarbons.

In relation to the connecting elements, it should be noted that these are preferably pipelines having a small internal volume compared to the internal volume of the reaction chambers and having no noticeable catalytic activity on their wall surface. The internal volume of the connecting conduit is preferably 50% less than the internal volume of the tubular reactor; the internal volume of the connecting conduit is further preferably 75% less than the volume of the tubular reactor; the internal volume of the connecting conduit is even further preferably 90% less than the internal volume of the tubular reactor. The product fluid and the reactant fluids are guided through the connecting conduits without occurrence of catalytic reactions that impair the method of the invention in the connecting conduits.

In a preferred embodiment, it is a characteristic feature of the apparatus of the invention that the terminal tubular reactors of each reaction system are equipped with a pressure-retaining device; the terminal reactors of each reaction system are preferably equipped with a common pressure-retaining device; the terminal reactors of each reaction system are further preferably equipped with a pressure-retaining device and a pressure-regulating device.

In a further embodiment which is likewise preferred, it is a characteristic feature of the apparatus of the invention that the individual connecting conduits (02) by which the tubular reactors of a tubular reactor group are connected have been provided with one or more temperature control units; preferably, the connecting conduits (02) are heated at the temperature corresponding to the temperature of the tubular reactor downstream of the connecting conduit; the temperature of the connecting conduits (02) is preferably in the temperature range of −25-900° C., further preferably of 0-800° C.

Through the use of angled connecting conduits (02), it is possible to retrofit existing high-throughput apparatuses in order then to conduct the method of the invention therewith. In existing high-throughput apparatuses, there already exist a multitude of tubular reactors in a parallel arrangement. It can be seen from the schematic diagrams in FIGS. 4.a and 4.b that the flow direction of the reactant stream in the tubular reactor group is either alternating (as shown in FIG. 4.a) or uniform (as shown in FIG. 4.b). In FIG. 4.b, the reactant stream runs or flows downward in each case with respect to the catalyst bed. The embodiment with the beds with downward through-flow is preferred.

In a further-preferred embodiment, it is a characteristic feature of the apparatus that the connecting conduits (02) that connect the tubular reactors of the tubular reactor groups have no operative connection to switching valves by which fluid streams are derived. Fluid sampling leads to disruption of the reaction characteristics in the downstream reaction stages and can cause irreversible damage to the downstream catalysts. Pressure surges caused by the sampling can also impair the reaction characteristics in the prior reaction stage. In a further embodiment, the apparatus of the invention may have an operative connection to switching valves by which fluid streams can be supplied to the downstream reaction stage. The addition of fluid may be necessary if the downstream reaction stages require further reactants for the progression of the reaction that are not required in the prior reaction stage or disrupt the progression of the reaction. In addition, it is thus possible to match the streams of matter of one or more reactants in the reactant stream individually to each reaction stage. For example, the hydrogen flow rate in the case of combined hydrogenation and cracking reactions is matched individually to the reaction stage in order to establish particular GHSV conditions or in order to replenish hydrogen consumed in the prior reaction stage and prevent a hydrogen deficiency. The number of reactant streams additionally metered in between the reaction stages influences the complexity of the method of the invention.

It is preferable that the apparatus of the invention is controlled using data technology means and the method is conducted in a fully automatic manner.

In addition, the invention also relates to a software controller which is present in the program controller which automatically controls and/or regulates the performance of the method for testing catalysts.

BRIEF DESCRIPTION OF THE FIGURES

FIG. 2.a shows a schematic diagram of three reaction systems, in the form of a two-stage, three-stage and four-stage reaction system, the two-stage reaction system being equipped with two reaction strands, and the three-stage reaction system being configured with three reaction strands and the four-stage reaction system with four reaction strands.

FIG. 2.b shows a schematic diagram of the three reaction systems shown in FIG. 2.a, where each individual tubular reactor has been provided with an individual heater for separate heating of the respective tubular reactor.

FIG. 3.a shows a schematic diagram of three reaction systems, in the form of a three-stage, four-stage and six-stage arrangement. The three-stage reaction system and the four-stage reaction system have two reaction strands, and the six-stage reaction system has three reaction strands; each individual reaction strand is formed from a serial arrangement of tubular reactors.

FIG. 3.b shows a schematic diagram of a two-stage reaction system in which each individual tubular reactor is equipped with multizone heating. The diagram shows three zones Z1, Z2 and Z3 for each tubular reactor. The number of heating zones may also be greater or less than three.

FIG. 4.a shows a schematic diagram of a three-stage reaction system in which it is a characteristic feature of the individual tubular reactor groups that the tubular reactors of the same group are arranged alongside one another in a horizontal plane. The tubular reactors of a reaction strand are operatively connected by angled or curved connecting elements (02). The flow through the tubular reactors here is downstream in the first stage, upstream in the second stage and downstream in the third stage.

FIG. 4.b shows a schematic diagram of a three-stage reaction system in which the flow through all tubular reactors runs downstream. The connecting conduits (02) here are configured such that they transport the fluid stream from the lower outlet from the first tubular reactor to the upper inlet of the adjacent tubular reactor. In this way, the flow through each of the series-connected reactors is from the top downward. In the series-connected reactors shown in FIG. 4.a, the fluid flow in adjacent reactors runs in different directions.

FIG. 4.c shows a schematic diagram of a three-stage reaction system in a diagram corresponding to the diagram of FIG. 4.a, with the tubular reactors of each reaction strand equipped with a dedicated heating apparatus. Likewise as in FIG. 4.a, the flow through the tubular reactors is downstream in the first stage, upstream in the second stage and downstream in the third stage.

FIG. 4.d shows a schematic diagram of a three-stage reaction system in which the flow through all tubular reactors is downstream. The diagram corresponds to the diagram in FIG. 4.b, with each of the connecting conduits in the reaction strands that connect the adjacent tubular reactors having a separate heating apparatus.

The arrangements of the reaction systems shown in the figures can be used to perform the method of the invention in the respective embodiments.

DETAILED DESCRIPTION OF THE FIGURES

Figure 1:
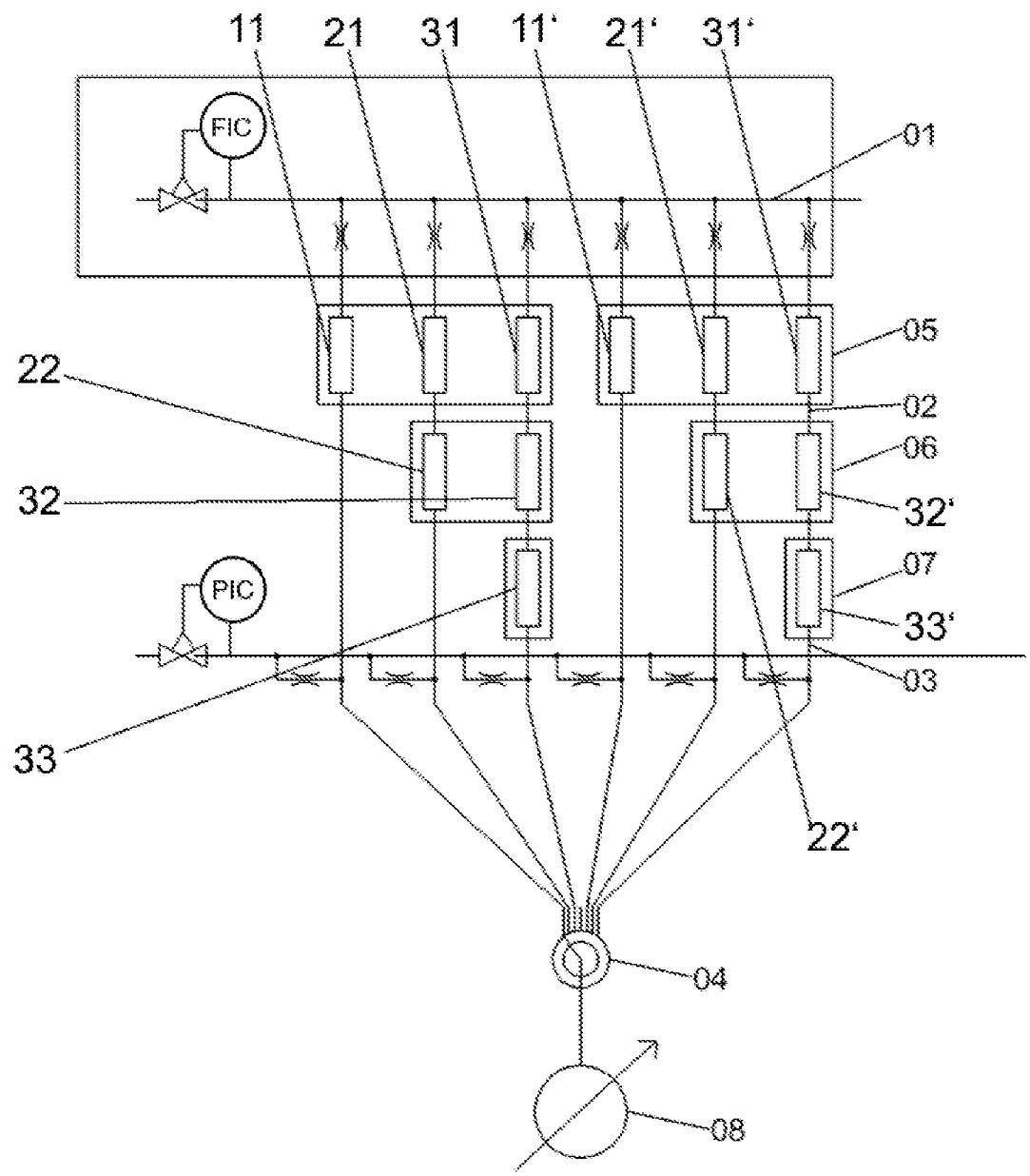
FIG. 1 shows a schematic diagram of an apparatus equipped with two reaction systems, with each reaction system designed for three process stages and having three reaction strands. Each reaction system has one heating apparatus per process stage.

FIG. 1 shows a schematic diagram of an apparatus equipped with two reaction systems intended for performance of three-stage processes. Thus, $A_{PS}$=3. Each reaction system has three reaction strands. Thus, nS=3. In the second reaction system, the tubular reactors have correspondingly been indicated by a prime. Each reaction system has three heating apparatuses, with the heating apparatus (05) heating the three reactors (11'), (22') and (31') of the first stage. The heating apparatus (06) heats the two reactors (22'), (32') of the second stage, and the heating apparatus (07) heats the reactor (33') of the third stage. It would also be possible for the heating apparatus (05) also to be used to heat the reactors (11), (22) and (33). The terminal tubular reactors (i.e. the tubular reactors (11), (22) and (33) or the tubular reactors (11'), (22') and (33')) of the two reaction systems are each connected to the valve (04) via outlet conduits. The reference numeral (02) has been included by way of illustration for the connecting conduit between individual tubular reactors (31') and (33'). It is preferable that the connecting conduits (i.e. the conduits indicated by reference numeral (02) or the conduits between adjacent reactors having no labeling) are also heated.

Preferably, the liquid products and gaseous products present in the product stream are separated prior to the analytical characterization and each subjected to separate characterizations. Not shown in FIG. 1 are sample collection vessels for separation of liquid samples that may be connected downstream of each individual terminal tubular reactor. The sample collection vessels are preferably disposed in the connecting conduit between reactor outlet and the multiport valve (04). The size of the sample collection vessels depends on the process performed in each case, the process conditions and the reactor size. Preferably, the internal volume of the individual sample collection vessels is in the range of 25 mL-1000 mL, further preferably in the range of 50 mL-250 mL. The filling of the sample collection vessels can be controlled by means of time control or by means of a fill level sensor. Liquid samples are taken for analysis in defined cycles. Preferably, the contents of the sample collection vessels are emptied in a cyclical manner, such that the amounts of sample collected per unit time are characteristic of the product stream composition that has been collected in the period of time chosen. By means of cumulative sampling over small time intervals, it is possible to draw conclusions as to the differential changes in the catalytic method. "Small time intervals" is understood to mean that the emptying and analysis of the particular sample collection vessel in question is performed at recurring time intervals of 0.25-20 hours; preferably, the analysis of the liquid sample from the respective sample vessel is conducted at a time interval of 0.5-10 hours. It should also be emphasized here that sampling in the case of those catalytic methods having both liquid and gaseous products in the product stream is extremely difficult and prone to disruption. The method of the invention using the parallel arrangement of tubular reactor groups or reaction strands with an appropriate number of tubular reactors solves the problem of proneness to disruption that occurs in intermediate sampling. This can improve the accuracy of the study. The improved accuracy can also be utilized to reduce the method scale, with assurance of high accuracy in spite of the decrease in scale.

The multiport valve (04) is a selection valve by means of which particular outlet conduits and product streams can be guided to the analysis conduit connected to instruments for performance of online analytical characterizations. The instruments may be one or more gas chromatographs equipped with an MS detector, FID, AAS. Those fluid streams that are not supplied to the selection conduit for characterization can be let out of the apparatus via a common outlet.

The scheme shown in FIG. 2.a shows three different reaction systems respectively comprising two, three and four reaction strands. Thus, the reaction systems shown serve to perform a two-stage method by means of the two arrangement, to perform a three-stage method by means of the three-stage arrangement, and to perform a four-stage method by means of the four-stage arrangement. FIG. 2.*b* shows that each individual tubular reactor may be equipped with an individual heater (H1, H2, H3, . . . ). Preference is given to an embodiment in which the temperature of the tubular reactors of the same process stage is controlled by means of the same heating system as shown in FIG. 1 for the heating element (05). It is thus possible for the reactors of the individual process stages to be equipped either with an individual heater or each with one collective heater for the respective process stage.

It is shown FIG. 3.*a* that the reaction systems may also be constructed from a specific selection of tubular reactor groups. For example, the left-hand side of FIG. 3.*a* shows a reaction system for performance of a three-stage process equipped with two reaction strands. Shown in the middle is a reaction system for performance of a four-stage process with two reaction strands. Shown on the right-hand side is a reaction system for the performance of a six-stage process provided with three reaction strands equipped with two, four and six series-connected tubular reactors.

FIG. 3.*b* shows three tubular reactors that form a parallel arrangement of one tubular reactor and one tubular reactor group, each equipped with specific heating units that enable multizone heating of the reactors.

FIG. 4.*a* shows the schematic construction of a reaction system for three process stages, wherein the tubular reactors are arranged in parallel and the tubular reactors of one group are operatively connected by angled or curved connecting conduits (02). The flow through the tubular reactors is downstream in the first stage, upstream in the second stage and downstream in the third stage.

FIG. 4.*b* shows a schematic diagram of a three-stage reaction system in which the flow through all tubular reactors runs downstream. The connecting conduits (02) here are configured such that they guide the fluid stream from the lower outlet from the first tubular reactor (for example from tubular reactor (21)) to the upper inlet of the adjacent reactor (i.e. to the tubular reactor (22)), and hence enable downstream flow through adjacent reactors (i.e. reactors (21) and (22) or else reactors (31), (32) and (33)).

FIG. 4.*c* shows a schematic diagram of a three-stage reaction system in a diagram corresponding to the diagram of FIG. 4.*a*, except that the tubular reactor groups of the individual reaction strands each have a separate heating apparatus. Likewise as in FIG. 4.*a*, the flow through the tubular reactors is downstream in the first stage, upstream in the second stage and downstream in the third stage.

FIG. 4.*d* shows a schematic diagram of a three-stage reaction system in which the flow through all tubular reactors is downstream. The diagram corresponds to the diagram in FIG. 4.*b*, with the tubular reactor groups, the individual tubular reactor and the connecting conduits each having a separate heating apparatus.

Figure 5:
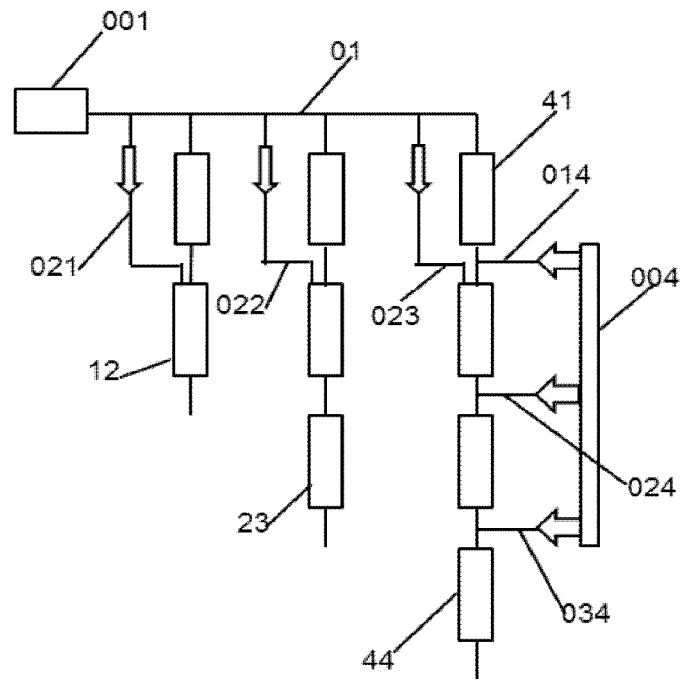
FIG. 5 shows a schematic diagram of a four-stage reaction system equipped with three reaction strands, with the respectively the reactors of the second process stage connected to the feeds (021), (022), (023) for reactant fluid. Furthermore, the reactors (42), (43), (44) of the third reaction strand are equipped with hydrogen feeds (014), (024), (034). Not shown are hydrogen feeds to the reactors of the second and first reaction strands.

A further preferred embodiment of the method of the invention is shown in FIG. 5, having the characteristic feature that the reactors of the second process stage are each supplied with fresh reactant fluid. Furthermore, the reactors of the second, third and fourth process stages of the fourth reaction strand are also supplied with hydrogen via the feed unit (004) and hydrogen feeds (014), (024), (034). The hydrogen feeds (014), (024), (034) are connected to the connecting conduits that connect the reactors arranged in series. Not shown were the hydrogen feeds to the other reactors of the higher process stages that are preferably also present. By virtue of the fact that the reaction chambers of the higher process stages have been subjected to identical reaction conditions, the conditions in the reaction strands in parallel arrangement may be subjected to high-precision control that contributes to the data quality. Sampling between the individual series-connected reaction chambers is not envisaged here.

Figure 6:
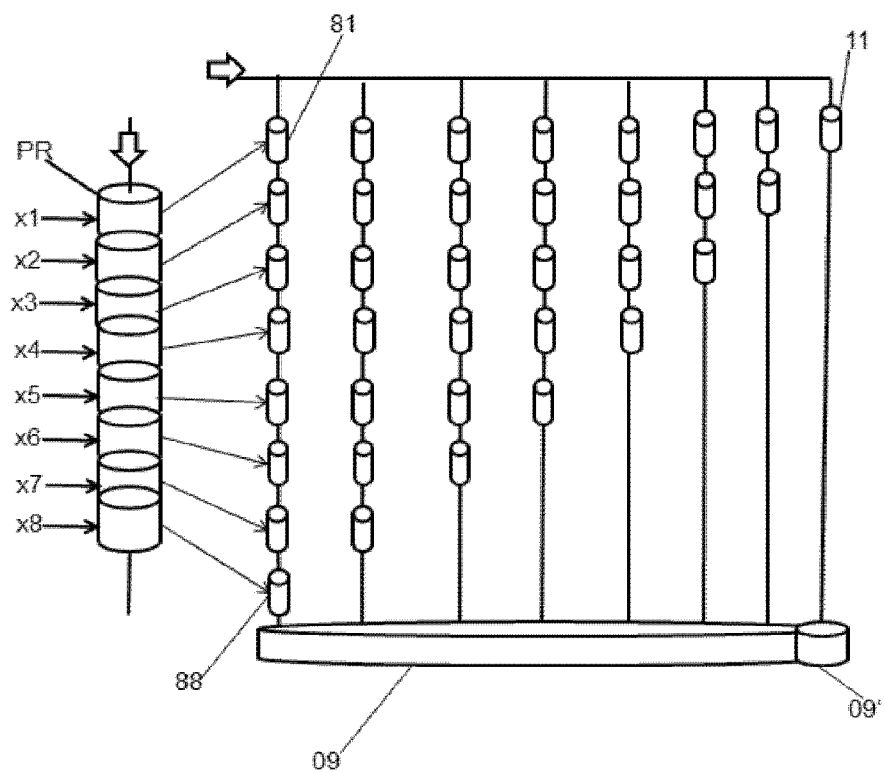
FIG. 6 shows a schematic diagram of an industrial pilot reactor (PR), the longitudinal axis of which has been divided into eight reaction zones x1-x8, and the experimental setup in order to simulate the process in the pilot reactor (PR) by means of a reaction system configured with eight process stages and eight reaction strands.

FIG. 6 shows a comparison of a pilot reactor (PR) and a reaction system having eight process stages, in order to illustrate how a pilot reactor (PR) is simulated by means of a preferred embodiment of the method of the invention. In the specific configuration with the eight process stages and eight reaction strands, 36 reactors are used. In the example, each individual reactor is filled with 5 grams of catalyst material. Thus, a total of 90 grams of catalyst material is used to simulate the technical process which is performed within the pilot reactor (PR) with a significantly greater amount of catalyst, specifically in the range of 10-500 kg. What FIG. 6 does not show is that the individual reaction stages of the reaction strands can be heated at different temperatures.

It should be noted that retrofitting of existing high-throughput apparatuses is possible in order to use them to perform the CPC method. The retrofitting can be performed in such a way that the existing high-throughput apparatus is retrofitted by integrating a reaction system having a large number of process stages therein, or by integrating multiple reaction systems having a smaller number of process stages therein. The options result from the construction of the existing high-throughput apparatuses, the number of insertion positions for tubular reactors and the design of the existing apparatus, especially in relation to the temperature control units and the components for supplying the reactant streams.

With regard to high-throughput research, the CPC method offers high flexibility, the effect of which is that the CPC method can be integrated into multifunctional apparatuses. By means of the multifunctional apparatuses, it is possible to conduct either a standard screening method or a CPC method.

In a further embodiment of the invention, the high-throughput apparatus is supplied in a modular form in which the individual modules of the apparatus are coupled to one another in the form of plug connections. On the basis of the assembly of apparatus modules, it is possible to configure the apparatus of the invention such that it is suitable for simultaneous performance of one or more CPC methods and for performance of screening methods.

LIST OF REFERENCE SIGNS

01—Feed for reactant stream
02—Connecting conduit between two tubular reactors or reaction chambers
03—Conduit on reaction chamber outlet side
04—Multipart valve with six feeds; selection conduit and common outlet not shown
05—Heating apparatuses for the first stage
06—Heating apparatuses for the second stage
07—Heating apparatuses for the third stage
08—Pressure regulator?
09—Analysis unit for a multitude of product fluids
09'—Analysis unit for a single product fluid
001—Reactant feed
021—Feed of reactant stream to the reactor (21)
022—Feed of reactant stream to the reactor (32)
023—Feed of reactant stream to the reactor (42)

004—Feed unit for hydrogen
014—Hydrogen feed to the reactor (42)
024—Hydrogen feed to the reactor (43)
034—Hydrogen feed to the reactor (44)
PR—Pilot reactor
x1-x8—Eight reaction zones along the longitudinal axis of the pilot reactor
551 Insertion for reactor(s) equipped with individual heaters
552—558 Insertions for reactor(s) equipped with individual heaters
H1, H2, H3, . . . —Individual heater for tubular reactor or reaction chamber
Z1, Z2, Z3—Heating zones for heating the regions of individual tubular reactors or reaction chambers
Two-digit number—Number on the right-hand side indicates the number of the reactor in the respective process stage. The number on the left-hand side indicates the number of the reaction strand. Counting is effected in such a way that the reaction strand having the smallest number of reaction chambers is given the number 1 and so forth.
YZ' Two-digit number with prime indicates a reaction system in parallel arrangement

What is claimed is:

1. A method for catalytic process characterization using one or more reaction systems each comprising two or more reaction strands in a parallel arrangement, each reaction strand comprising either multiple series-connected reaction chambers or a single reaction chamber, and each reaction strand having a different number of reaction chambers compared to all other reaction strands within the same reaction system, the method comprising the following steps:
   i) filling the reaction chambers of the reaction strands with a catalyst material,
   ii) supplying each reaction strand with a reactant stream,
   iii) subjecting the reactant streams to a different number of process stages in each reaction strand,
   wherein an individual process stage comprises either one type of reaction and/or one degree of conversion in a given reaction, and
   wherein each reaction strand discharges a product stream,
   iv) subjecting the product streams to an analytical characterization, and
   v) expressing in relative terms the data achieved from the different reaction strands in the analytical characterization of the product streams.

2. The method according to claim 1, wherein two or more reaction systems are used, and
   wherein steps i)-v) or steps ii)-v) are performed simultaneously among the two or more reaction systems.

3. The method according to claim 1, wherein within a reaction system, each reaction strand has a first reaction chamber,
   wherein each first reaction chamber is supplied with a reactant stream sharing a property with the other reactant streams supplied to the other first reaction chambers within the reaction system,
   wherein the property is at least one selected from the group consisting of chemical composition, molar flow rate, volume flow rate, and mass flow rate.

4. The method according to claim 1, wherein the number of process stages $A_{PS}$ is in the range of 2-40 and/or the number of product streams being simultaneously subjected to the analytical characterization is in the range of 2-20.

5. The method according to claim 1, wherein within a reaction system, each reaction strand comprises one or more downstream reaction chambers, each downstream reaction chamber supplied with an additional reactant stream of the same composition and of the same amount as all other downstream reaction chambers within the reaction system.

6. The method according to claim 1, wherein the reaction chambers for different process stages of a reaction system are stored at different temperatures in a range of −25 to 900° C., and
   wherein the reaction chambers for identical process stages of a reaction system are stored at the same temperature, where the temperature is in a range of −25 to 900° C.

7. The method according to claim 1, wherein the reaction chambers are configured as tubular reactors having an internal diameter in the range of 2-50 mm and a length in the range of 5-150 cm.

8. The method according to claim 1,
   wherein the reaction chambers are configured as tubular reactors each comprising one or more catalysts, and
   wherein the tubular reactors for the same process stage of a reaction system each comprise the same one or more catalysts.

9. The method according to claim 1,
   wherein the reaction chambers are configured as tubular reactors each comprising one or more catalysts, and the tubular reactors of the same process stage within a reaction system each comprise the same one or more catalysts, and
   wherein the tubular reactors of the same process stage within a reaction system each comprise the same amounts of the one or more catalysts, the one or more catalysts being in a particulate form with particle diameters in a range of 1-10 000 μm, and/or
   wherein the one or more catalysts are diluted with an inert material, and wherein the one or more catalysts of the same process stage within a reaction system each have the same degree of dilution with the inert material which is characterized by a catalyst to inert material mass ratio of 0.01:100 to 100:1.

10. The method according to claim 1, wherein the composition of the product streams is analyzed and the result of the analysis of the different product streams is expressed in relative terms, which comprises forming a difference, wherein a mass balance of the product streams is characterized by a standard deviation of +/−10% by weight.

11. The method according to claim 1, wherein the reactant streams comprise at least one selected from the group consisting of a natural gas, a light natural gas, a moderately light natural gas, a heavy natural gas, a crude oil, a naphtha, a gasoline, a kerosene, a diesel, a middle distillate, a vacuum gas oil, an atmospheric residue oil, a vacuum residue oil, a mineral oil, a biobased oil, a hydrogen gas and a synthesis gas, and
   wherein the reactions are reactions from a refinery sector, from petrochemistry, or from synthesis gas chemistry.

12. The method according to claim 1, wherein the method is conducted at a pressure in the range of 1-500 bara,
   wherein a reactant stream in the form of a liquid is supplied with an LHSV in the range of 0.05-20 $h^{-1}$, and
   wherein a reactant stream in the form of one or more gases is supplied with a GHSV in the range of 10-50 000 $h^{-1}$.

13. An apparatus for performing the method of claim 1,
   wherein the apparatus has one or more reaction systems, each reaction system has, in a parallel arrangement, at least two reaction strands having reaction chambers, each reaction strand equipped with a different number of reaction chambers,
   wherein each reaction strand of a reaction system has a terminal tubular reactor equipped with a common pressure-retaining device, and wherein the reaction chambers of a particular reaction strand are connected in series by connecting conduits, the connecting conduits optionally equipped with switching valves through which reactant streams are supplied.

14. The apparatus of claim 13, further comprising a software controller that automatically controls and/or regulates the performance of the method of claim 1.

15. A method for catalytic process characterization using one or more reaction systems, each reaction system comprising two or more reaction strands in a parallel arrangement, each reaction strand comprising either multiple series-connected tubular reactors or a single tubular reactor, each reaction strand having a different number of reaction chambers compared to all other reaction strands within the same reaction system, wherein connection conduits between the series-connected tubular reactors either have no operative connection to switching valves or have one or more operative connections to switching valves, wherein components connected to the connection conduits are feed elements configured to receive fluid streams, each connection conduit having an internal volume that is about 50% less than the internal volume of a tubular reactor connected thereto, the method comprising:
- i) filling the individual tubular reactors of the reaction strands with a catalyst material,
- ii) supplying each reaction strand with a reactant stream, wherein each reaction system is supplied with at least two reactant streams of the same chemical composition,
- iii) subjecting the reactant streams to a different number of process stages in each reaction strand,
  - wherein an individual process stage comprises either one type of reaction and/or one degree of conversion in a given reaction, and
  - wherein each reaction strand discharges a product stream,
- iv) subjecting each product stream to an analytical characterization, and
- v) expressing in relative terms the data achieved from the different reaction strands in an analytical characterization of the product streams.

16. An apparatus for performing a catalytic process characterization, the apparatus comprising:
- one or more reaction systems, each reaction system comprising, in a parallel arrangement, at least two reaction strands having tubular reactors, each reaction strand equipped with a different number of tubular reactors,
- wherein the reaction chambers of a particular reaction strand are connected in series by connecting conduits, the connecting conduits optionally equipped with switching valves through which fluid streams are supplied,
- the apparatus being configured to:
  - i) fill each tubular reactor of the reaction strands with a catalyst material,
  - ii) supply each reaction strand with a reactant stream, wherein each reaction system is supplied with at least two reactant streams of the same chemical composition,
  - iii) subject the reactant streams to a different number of process stages in each reaction strand,
    - wherein an individual process stage comprises either one type of reaction and/or one degree of conversion in a given reaction, and
    - wherein each reaction strand discharges a product stream,
  - iv) subject each product stream to an analytical characterization, and
  - v) express in relative terms the data achieved from the different reaction strands in an analytical characterization of the product streams.

17. The apparatus of claim 16, wherein each reaction strand of a reaction system has a terminal tubular reactor equipped with a common pressure-retaining device.

* * * * *